(12) United States Patent
Pan

(10) Patent No.: US 6,615,273 B1
(45) Date of Patent: Sep. 2, 2003

(54) METHOD FOR PERFORMING ENHANCED TARGET IDENTIFIER (TID) ADDRESS RESOLUTION

(75) Inventor: Jingning Pan, Holmdel, NJ (US)

(73) Assignee: Lucent Technologies Inc., Murray Hill, NJ (US)

(*) Notice: Subject to any disclaimer, the term of this patent is extended or adjusted under 35 U.S.C. 154(b) by 0 days.

(21) Appl. No.: 09/488,479

(22) Filed: Jan. 20, 2000

(51) Int. Cl.[7] .............................................. G06F 15/173
(52) U.S. Cl. ....................... 709/242; 709/232; 709/237; 709/238; 709/239; 709/242; 709/243; 370/351; 370/400; 370/395.3; 370/428
(58) Field of Search ................................ 709/232, 238, 709/243, 237, 239, 242

(56) References Cited

U.S. PATENT DOCUMENTS

| | | | |
|---|---|---|---|
| 5,165,024 A | * | 11/1992 | Sweazey |
| 5,719,861 A | * | 2/1998 | Okanoue |
| 5,925,137 A | * | 7/1999 | Okanoue |
| 5,987,011 A | * | 11/1999 | Toh |

OTHER PUBLICATIONS

Reverse Path Forwarding of Broadcast Packets, by Yogen K. Dalal and Robert M. Metcalfe published in Communications of the ACM, vol. 21, No. 12, pp. 140–147, Dec. 1978.

* cited by examiner

*Primary Examiner*—Ayaz Sheikh
*Assistant Examiner*—Young N Won

(57) ABSTRACT

A method is provided for a network including a plurality of nodes where a originating node broadcasts an address request or change PDU. When the PDU is received at a receiving node, the receiving node determines from a look-up routing table whether the broadcast PDU was received on an optimal interface, i.e. an interface which defines the shortest path between the originating and receiving nodes. If the interface was determined to be optimal, the receiving node forwards the request PDU along every interface belonging to the receiving node except the optimal interface, otherwise, the receiving node drops the request PDU. When node address information concerning the originating node cannot be obtained from the routing database of the receiving node, a unique medium node is located to assist in making the optimal interface determination. The method completely avoids the formation of loops thereby improving the performance of a telecommunication management network.

3 Claims, 5 Drawing Sheets

METHOD FOR PERFORMING ENHANCED TARGET IDENTIFIER (TID) ADDRESS RESOLUTION

BACKGROUND OF THE INVENTION

1. Field of the Invention

The invention generally relates to communication protocols among nodes in a shared network, and more particularly to an improved address resolution protocol to resolve network target identifier (TID) addressing in a shared network and avoid loop formation.

2. Description of the Related Art

A protocol is a set of conventions or rules that govern the transfer of data between computer devices. Protocols are typically separated into layers in an attempt to simplify protocol design. When viewing the layers of a protocol, one commonly speaks of a protocol stack. The lowest layer of the stack typically consists of the physical protocols while, the highest layer are the application layer protocols. The address resolution protocol is a low-level protocol that dynamically binds or maps a logical address to the correct protocol address. In a Telecommunication Management Network (TMN), the address resolution protocol is referred to as a target identifier address resolution protocol (TARP). TARP is widely used in the TMN area, and is required by-the GR-253-core standard. In a TM network, a nodes logical address is referred to as a target identifier (TID) address, the protocol address is referred to as a network entity title (NET) address. In a TM network when an originating node knows the TID of a target node in the network and needs to determine the target nodes NET address, the node will propagate Type 1 and Type 2 PDUs to the network. A PDU is an OSI term synonymous with a packet in a TCP/IP network.

Another situation which involves address resolution and PDU propagation in a TM network is where a node needs to notify other nodes of a TID or protocol address change. In this situation, the node will propagate a Type 4 PDU on the network.

As is well known, the propagation of Type 1, 2, or 4 PDUs in the TM network can potentially create undesirable forwarding loops. One earlier solution to the problem of disruption caused by forwarding loops in a TM network has been the use of a Loop Detect Buffer (LDB) which involves storing the protocol address of the node originating the Type 1, 2, or 4 PDU on the network along with the originating nodes sequence number as an LDB entry at every other node in the TM network. Upon receiving a rebroadcast of the PDU at the receiving node, the protocol address of the originating node and sequence number are compared against the previously stored LDB entry. If the protocol addresses match and the sequence number is less than or equal to that stored in the LDB, the receiving node simply discards the PDU and does not forward it to prevent further network disruption. Otherwise, the receiving node will forward the PDU along each interface except the receiving interface and update the LDB entry. The LDB solution is deficient, however, in that it gives rise to Target Address Resolution Protocol (TARP) Type 2 or TARP Type 4 storms, a form of network flooding generally defined as the excessive retransmission and forwarding of broadcast PDUs. When a node receives a TARP PDU with sequence number zero, its corresponding LDB entry will be updated to zero. In a large network, it is possible for a TARP PDU with sequence number zero and non-zero to co-exist. Therefore, a node will alternatively update its LDB entry to zero or non-zero. To address these storms an LDB entry timer has been proposed. This proposal is deficient in that, during the time-out period, a node cannot receive any packets at all. If the node is a gateway network element (GNE) or node, the network element may significantly block network communication during the timeout period. Moreover, despite the use of the LDB entry timer, there is no guarantee that a loop will not be formed in the first place. In addition, when a network is large, a lot of memory for the LDB buffers is needed.

A need therefore exists for an enhanced TARP which overcomes the limitations of the prior art discussed above.

SUMMARY OF THE INVENTION

The present invention provides an enhanced address resolution protocol based on reverse path forwarding (RPF). The enhanced target identifier address resolution protocol (TARP) of the present invention provides a method for performing address resolution of target identifier protocol data units (TARP PDUs). The method includes the following steps. First, an originating node broadcasts an address request in the form of a TARP PDU to every other node sharing the network. Upon receiving the broadcast TARP PDU at a particular receiving node, assuming that the receiving node was not the intended target (i.e., TARP PDU destination), the receiving node decides to either drop the TARP PDU or forward it along the network. The decision to either drop or forward the TARP PDU depends upon which interface the TARP PDU was received on. Specifically, the decision to drop or forward a TARP PDU requires that the receiving node perform a forwarding table look-up to retrieve a stored optimal interface identifier associated with the originating node issuing the current TARP PDU. If the interface over which the TARP PDU was actually received by the receiving node is equivalent to the optimal interface identifier obtained from the forwarding table look-up, the TARP PDU is forwarded (i.e., propagated) along the network through each interface associated with the receiving node, except the receiving interface (i.e., optimal interface). Otherwise, the TARP PDU is dropped by the receiving node.

The decision to drop or forward TARP PDUs is based upon the methodology of Reverse Path Forwarding (RPF) which defines an optimal interface. In accordance with RPF, a received TARP PDU will only be forwarded along the network by that receiving node if the PDU was received on an "optimal" interface, defined as an interface that the receiving node would choose to send a PDU back to an originating node by the shortest path algorithm, which is well known in the art. Otherwise, in accordance with RPF, if the interface over which the PDU was received was non-optimal, the PDU will be dropped by the receiving node. The forwarding look-up table controlled by each node's IS-IS routing engine, stores optimal interface identifiers, as defined by RPF, that can be used to determine whether the received TARP PDU was received over an optimal or non-optimal interface.

In one aspect of the present invention, the receiving node, in certain instances, will not be able to determine the optimal interface from its forwarding table because the originating node is not contained in the receiving node's forwarding table. In this case, the receiving node will locate a unique median node, which acts as a substitute for the originating node, that is in the forwarding table of the receiving node, to determine whether the PDU received by the receiving node was received over an optimal interface.

The method of the present invention advantageously improves network performance, especially for larger networks, since network flooding is completely avoided as a consequence of dropping TARP PDUs in accordance with the RPF algorithm. That is, by checking the interface over which a broadcast TARP PDU was received, the enhanced TARP protocol of the present invention can avoid the generation of TARP PDU storms. A further advantage of the present invention is that it is simple to implement and is robust. Another advantage is that the enhanced protocol is compatible with the existing TARP protocol and can be deployed in networks with the existing TARP protocol.

BRIEF DESCRIPTION OF THE DRAWINGS

The foregoing features of the present invention will become more readily apparent and may be understood by referring to the following detailed description of the present invention, taken in conjunction with the accompanying drawings, where.

DETAILED DESCRIPTION OF THE PREFERRED EMBODIMENTS

The present invention comprises a novel network target identifier address resolution protocol (TARP) based on reverse path forwarding (RPF). The following description is presented to enable one skilled in the art to make and use the invention, and is provided in the context of a particular application and its requirements. Various modifications will be readily apparent to foe dolled in the art, and the generic principles defined herein may be applied to other embodiments and application without departing from the spirit and scope of the invention. Thus, the present invention is not intended to be limited to one embodiment but is to be accorded the widest scope consistent with the principles and features disclosed herein.

Figure 1:
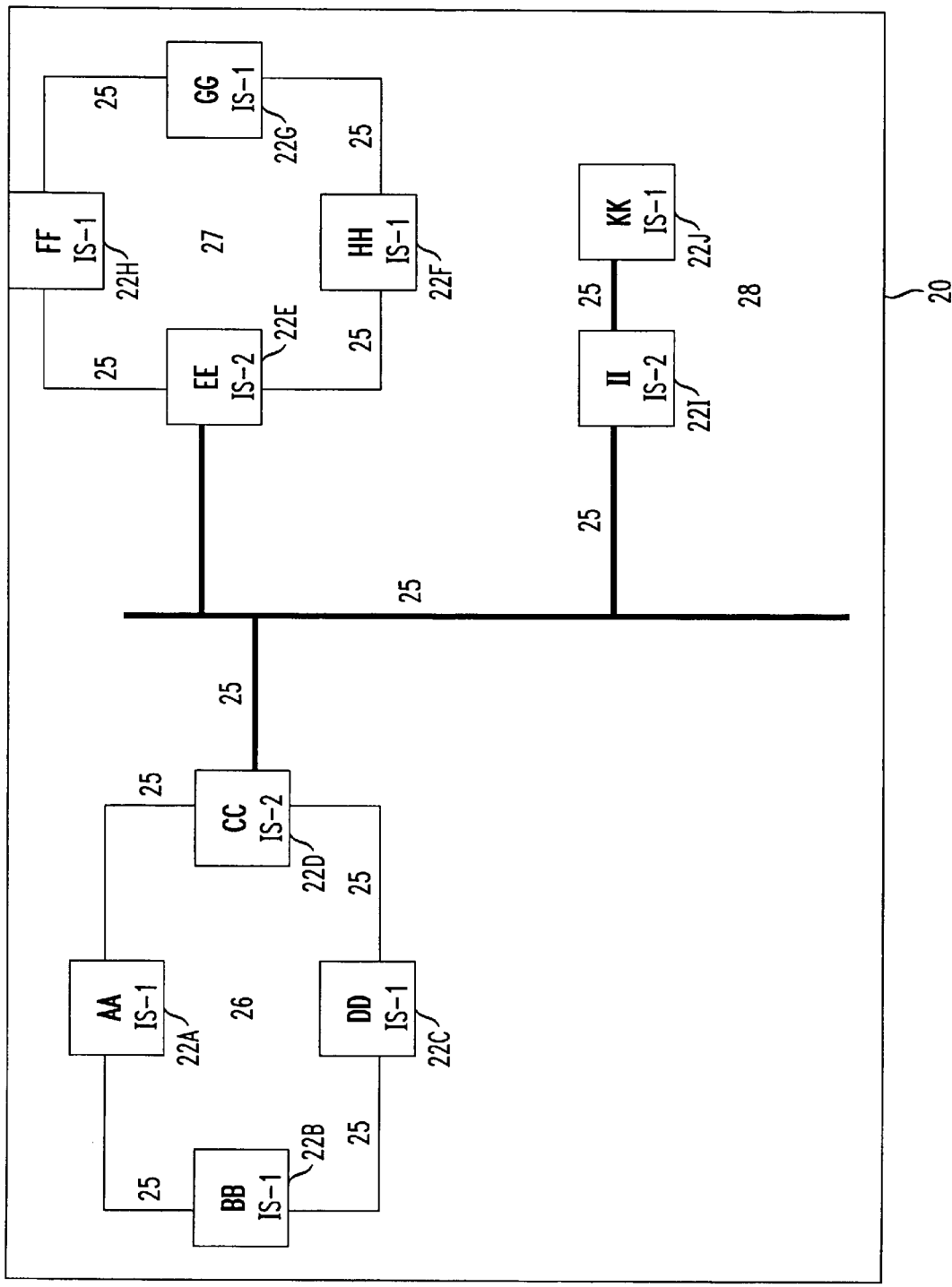
FIG. 1 illustrates a block diagram of a communication network which includes a plurality of nodes which can apply the enhanced address resolution protocol of the present invention.

Referring to FIG. 1, there is shown a typical communication network 20 which includes nodes 22A–22J. Each node in the network of FIG. 1 is defined to be either a level 1 (IS1) or level 2 (IS2) node for receiving TARP PDUs from transmission links 25 and forwarding TARP PDUs to transmission links 25 according to the IS-IS (Intermediate System) routing protocol at the network layer of the OSI (Open Systems Interconnection) stack. Each node is capable of sending and receiving TARP type-1, 2, and 4 broadcast PDUs containing the protocol address of the originating node. The protocol address will hereinafter be referred to as a Network Entity Title (NET) address, as is commonly used in a TM network Briefly stated, propagation of the address resolution PDU is performed in a TM network in two situations. First, when a originating node must determine the NET address of a target node, a broadcast PDU, i.e., TARP Type 1 or 2 PDU, is transmitted on the network. More specifically, the originating node polls or broadcasts the TARP Type 1 or 2 PDU which contains the target identifier (TID) of the target node and the NET address of the originating node to each node in the network. The originating node then waits for the target node to respond to the TARP Type 1 or 2 PDU by transmitting a response TARP PDU (Type 3) addressed to the originating node and containing the target nodes NET. In the second situation, an orginator's NET has been changed, the node propagates a Type 4 PDU to the network to inform the other nodes of the address change.

FIG. 1 illustrates the architecture of a typical communications network in which a plurality of nodes, defining level 1 and 2 nodes (i.e., IS1 and IS2 nodes), are each connected in one of three routing areas (i.e., networks 26, 27, and 28) where routing areas 26 and 27 define a ring topology and routing area 28 defines a bus topology. It should be noted that the present invention is not limited to the ring and/or bus topologies, but may include, in alternate embodiments, a star, tree, or other common network topologies as known in the art Nodes {AA, BB, CC, DD} are located in routing area 26, nodes {EE, FF, GG, HH} are located in routing area 27, and nodes {II, KK} are located in routing area 28. Each routing area supports communication among the devices (nodes) attached to that routing area via transmission links 25. To better illustrate the method of the present invention, node AA in routing area 26 is designated as an originating node (i.e., a node which originates a TARP PDU) and node FF in routing area 27 is designated as the target node (i.e., a node for which the TARP PDU is intended). Before any information can be transmitted from node AA to node FF, node AA must first determine the NET address of target node FF.

In accordance with the present example, originating node AA will broadcast a TARP PDU to every other node in the network to determine the NET of target node FF. Table 1 shows the data fields associated with a broadcast TARP PDU, where the relevant fields include a target identifier (TID) field, tar-tln, defining the target identifier of the target node (e.g. node FF in the present example), and the NET address, tar-por, defining the NET address of the source node (e.g., node AA in the present example).

TABLE 1

| TARP PDU FIELDS | Abbreviation | Field Size (bytes) |
| --- | --- | --- |
| TARP lifetime | tar-lif | 2 |
| TARP sequence number | tar-seq | 2 |
| Update Remote Cache (URC) and TARP Type Code | tar-tcd | 1 |
| TID Target Length | tar-tln | 1 |
| TID Originator Length | tar-oln | 1 |
| Protocol Address Length | tar-pln | 1 |
| TID of Target | tar-ttg | n = 0, 1, 2 . . . |
| TID of Originator | tar-tor | n = 0, 1, 2 . . . |
| Protocol Address of Originator | tar-por | n = 20 |

The Net operates at the network layer of the OSI (Open Systems Interconnection) stack which is the layer responsible for forwarding TARP PDUs across multiple links (i.e., through one or more nodes). Therefore, if originating node AA desires to communicate with node FF, it must do so across multiple nodes, i.e., nodes CC and EE, for example. Therefore, to satisfy the requirements of the network layer, node AA must determine the NET of target node FF prior to conducting communicating therebetween.

Each node on the network 20 receives the TARP Type 1 and/or Type 2 broadcast PDUs and determines, first whether it is the intended receiver of the broadcast TARP PDU, and if not, whether or not to forward or drop the TARP PDU in accordance with the method of the present invention, based on the principles of Reverse Path Forwarding.

Figure 2:
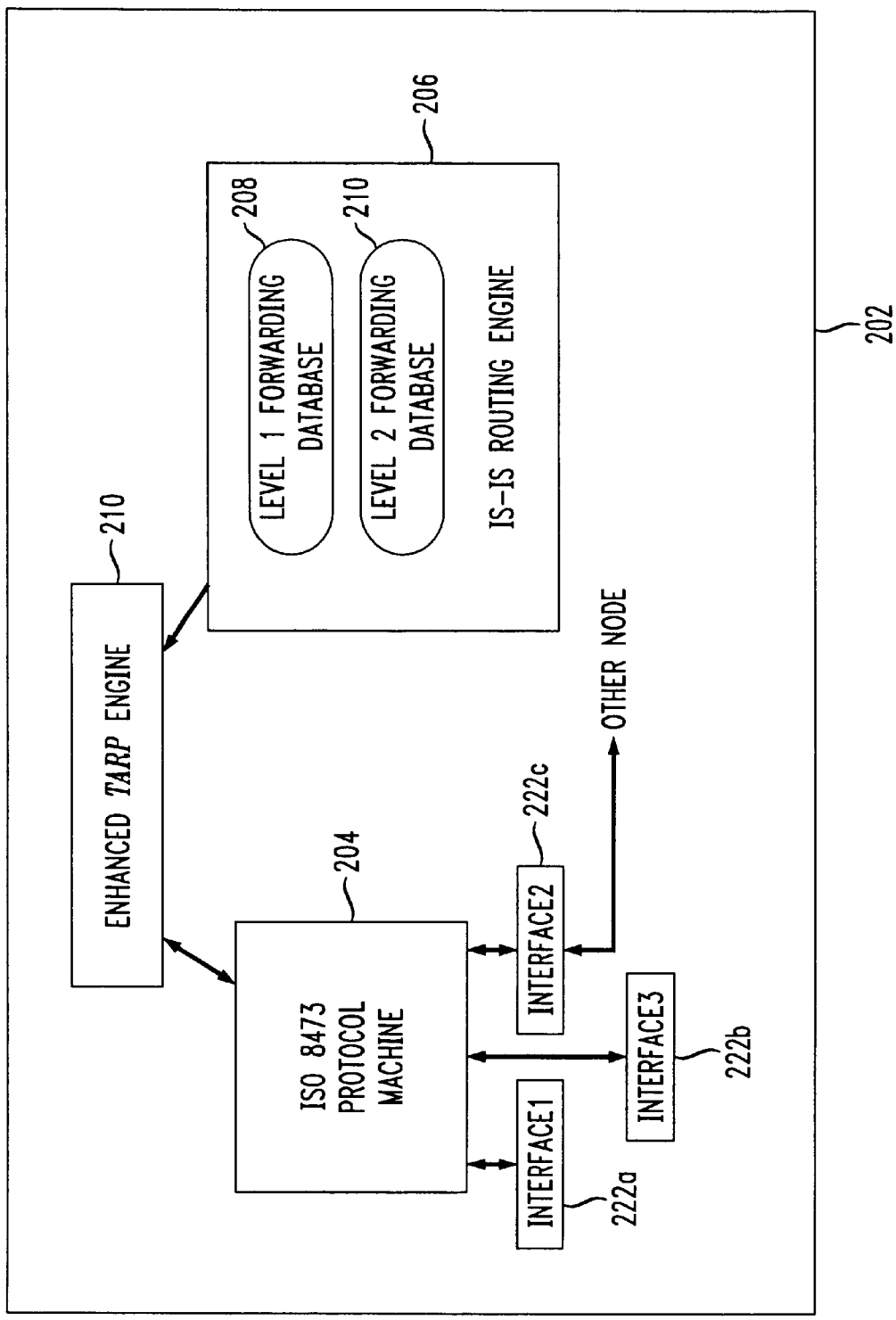
FIG. 2 illustrates a representative node of the communication network of FIG. 1.
Figure 3A:
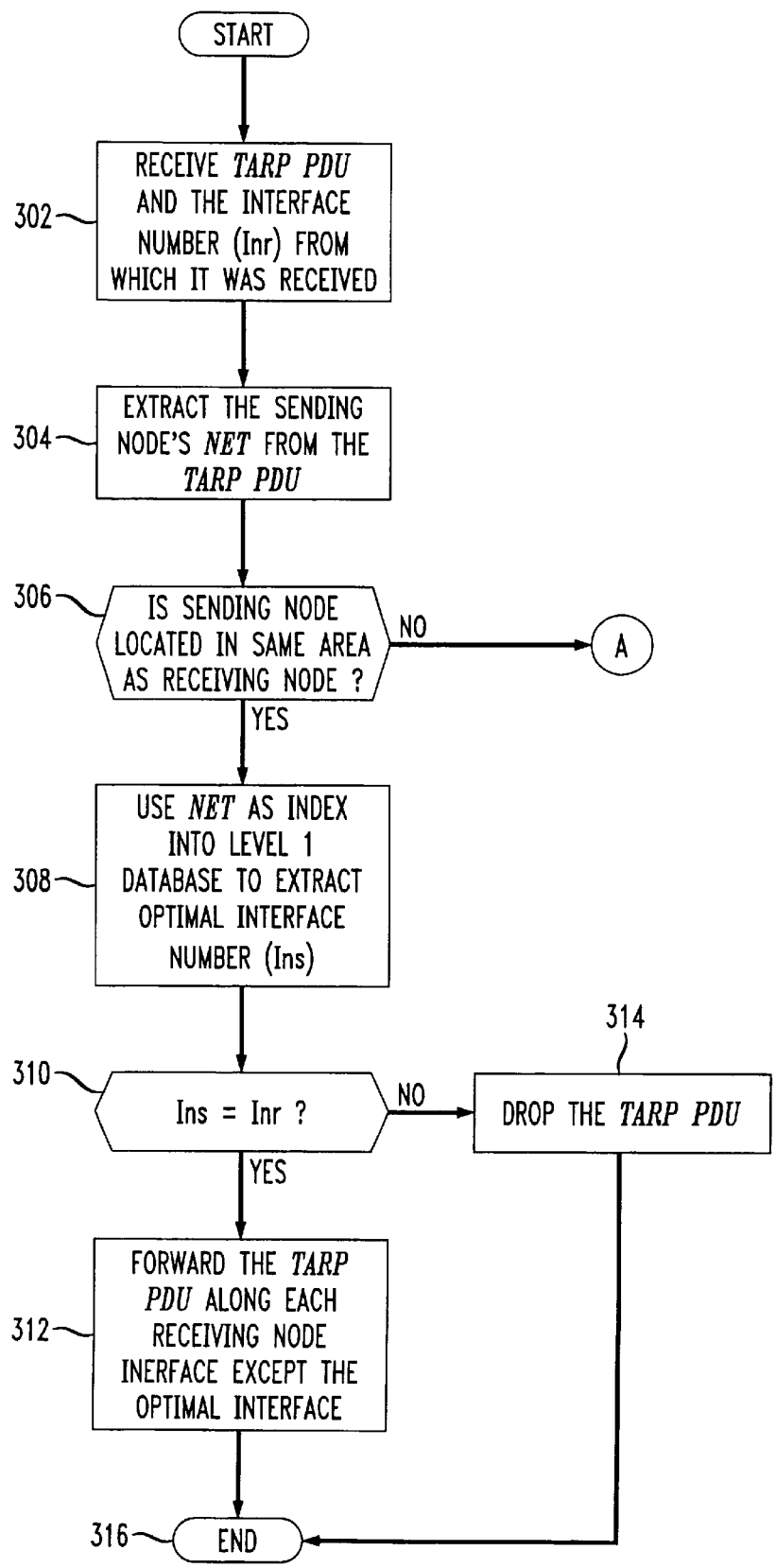
FIGS. 3A–3C are flowcharts for illustrating the operation of the enhanced TID address resolution protocol of the present invention at a representative node in the network, which receives an address request TARP PDU.
Figure 3B:
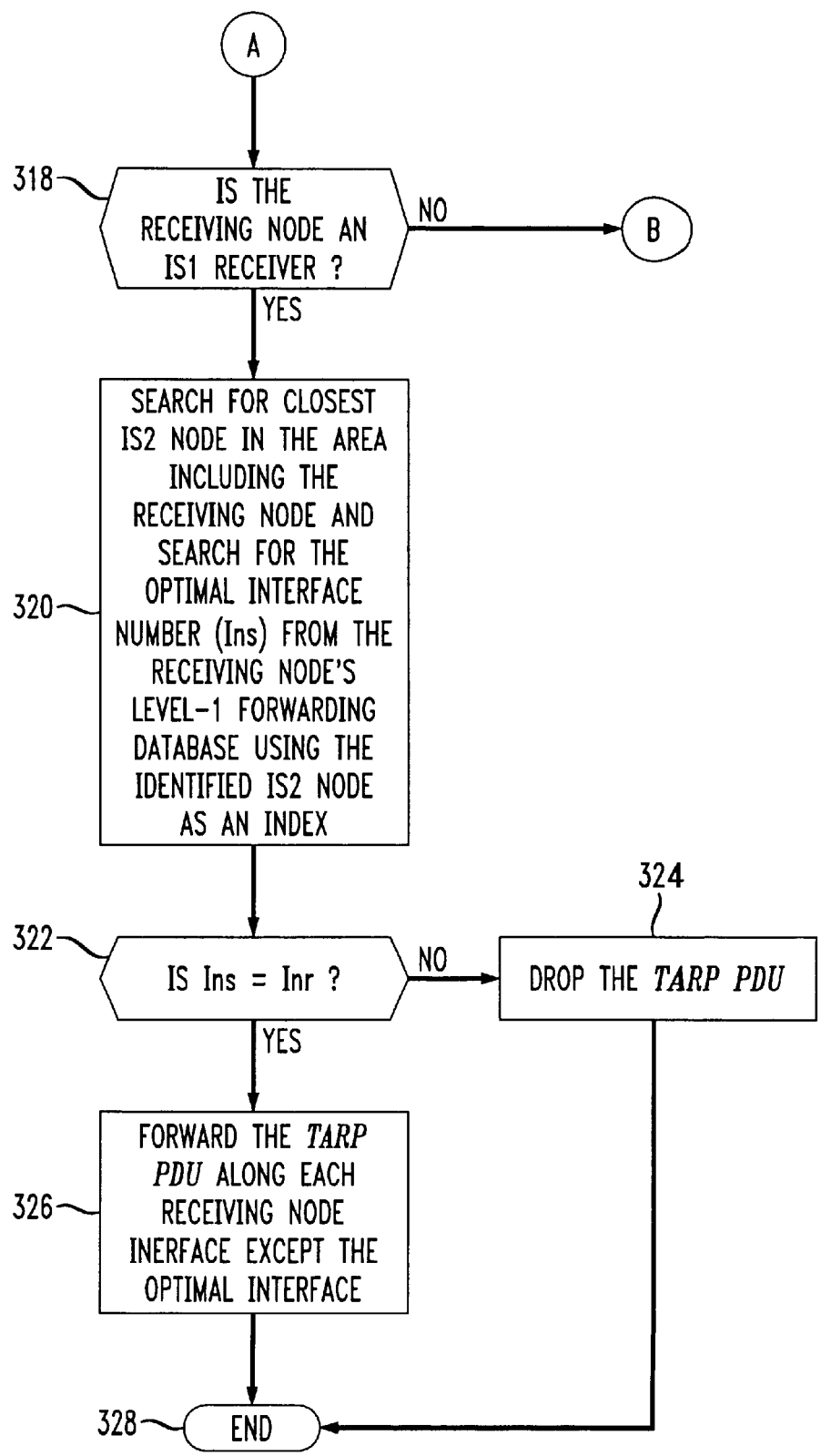
Figure 3C:
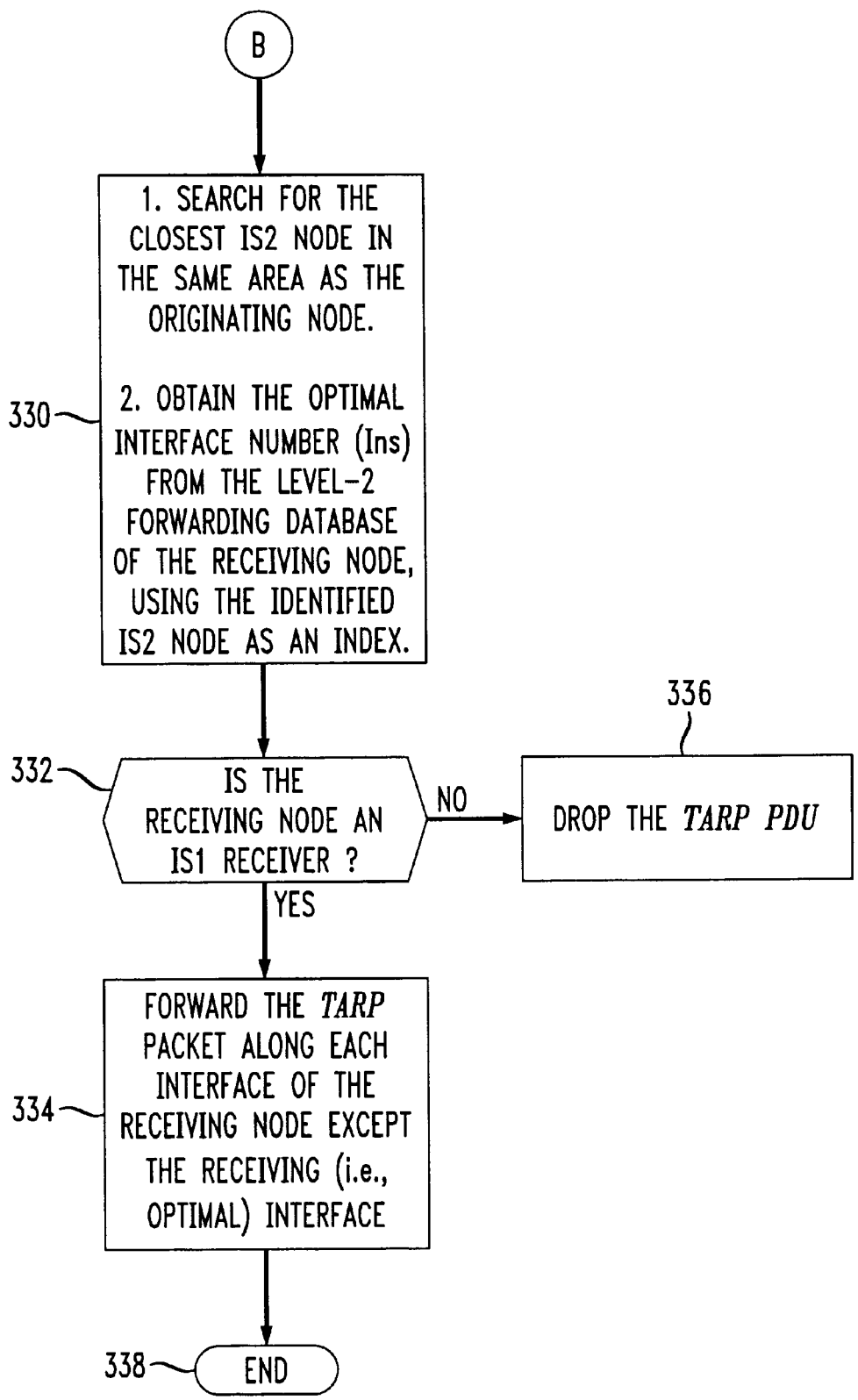

The decision to forward or drop a broadcast TARP PDU by a receiving node will be better understood with reference to the following description with reference to FIG. 2, which illustrates a representative node in the network, and with further reference to the flowcharts of FIGS. 3A–3C.

FIG. 2 illustrates the configuration of a representative network node in accordance with the present invention. The node may be either a receiving or originating node. The role of a node as an originating node for sending or distributing TARP PDUs, or as a receiving node for receiving TARP PDUs can change with changing information flow in the network. Thus, at one moment a node may serve as an originator, and later it may serve as a receiving node.

Referring to FIG. 2, the representative node 202 includes an ISO 8473 protocol machine 204 required to support the network protocol at the Open Systems Interconnection (OSI) layer 4 (i.e., transport layer), a plurality of network interfaces (e.g., three interfaces, i.e., 222a, 222b, 222c, are depicted in the exemplary embodiment of FIG. 2). The number of interfaces is unique to each node in the network and is determined as a function of desired system interoperability with neighboring nodes. In a point-to-point subnetwork, for example, the ID of interfaces is equivalent to the circuit number, but in a broadcast subnetwork (i.e., LAN) the ID of interfaces represents a particular MAC address of a particular node in the LAN. In the latter case; the number of interfaces are equivalent to the number of nodes in the LAN. Also shown in FIG. 2 is an IS-IS routing engine 206 which contains an IS-IS routing protocol for dynamically calculating optimal routes and deciding how to forward packets.

The IS-IS routing engine further includes a level 1 forwarding database 208 and a level 2 forwarding database 210. The level 1 and 2 forwarding databases are dynamically updated in accordance with changing system conditions (i.e., dynamically determined optimal routes which result from failed nodes, removed nodes, and added network nodes) and store information defining an optimal interface identifier associated with each node within the level 1 and level 2 domains. That is, the level 1 domain comprises those nodes located in the same routing area as the representative node. The level 2 database domain comprises those nodes defined to be IS2 nodes located throughout the entire network. Optimal interface identifiers will be stored in the respective databases based on the dynamically updated optimal route determinations performed by the IS-IS routing engine.

The level 1 and level 2 databases associated with the representative node in the network are each comprised of multiple records where each record is associated with another network node as will be described in greater detail below. Each record contains an optimal interface identifier field which identifies the representative node interface over which the representative node would transmit a unicast packet back to the record node over a path determined to be a "shortest path" between the respective nodes. That is, the optimal interface identifiers associated with each node are determined in accordance with Dijkstra's Shortest Path First (SPF) algorithm, which is well-known in the art. See, e.g., Sedgewick, R. *Algorithms*, Addison-Wesley, 1984.

Table 2 illustrates an exemplary level 1 database for node CC in routing area 26 of FIG. 1.

TABLE 2

| Level - 1 Originating Nodes | Optimal Interface ID |
| --- | --- |
| BB | 222a |
| AA | 222b |
| DD | 222b |

Referring again to FIG. 1, the routing area 26 includes four nodes (AA, BB, CC, DD). The level 1 database for node CC consists of three database records corresponding to nodes AA, BB, and DD, located in routing area 22. Each database row entry defines an optimal interface identifier, as shown above in Table 2. It should be noted that each node will contain a number of interfaces equal to the number of adjacency nodes with which it forms a point-to-point connection or LAN connection.

Table 3 illustrates an exemplary level 2 forwarding database associated with node CC. Table row entries are included for only those nodes which define level 2 (IS2) nodes outside the immediate routing area of node CC, namely, routing area 26. Referring again to FIG. 1, node EE is the only level 2 (i.e., IS2) node located in routing area 24, and node II is the only level 2 node located in routing area 28.

TABLE 3

| Level - 2 Originating Nodes | Optimal Interface ID |
| --- | --- |
| EE | 222a |
| II | 222b |

Also shown in FIG. 2 is an enhanced TARP engine 214 which provides control capability for controlling the decision processes associated with determining whether or not to forward or drop received TARP PDUs. The TARP engine 214 controls operations including the table look-ups to retrieve optimal interface identifiers from the level 1 and level 2 databases.

As will be described in accordance with the flow diagrams of FIGS. 3A–3C, the method of the present invention provides a solution for determining whether a receiving node (i.e., an IS1 or IS2 node) in the network 20 should drop a TARP PDU received on one of its interfaces or instead forward the TARP PDU along each interface except for the receiving (i.e., optimal) interface. The determination to drop or forward a TARP PDU depends upon whether the received TARP PDU was received on the optimal interface, where an optimal interface is defined in the "shortest path" sense. The optimal interface identifier for each node is stored in either the level 1 208 or level 2 210 forwarding database at each receiving node, as described above.

Referring now to FIG. 3A there is shown a flowchart illustrating the process steps for how a receiving node (e.g. node CC) determines whether to forward or drop a received TARP PDU. At step 302, a broadcast TARP PDU is received at receiving node CC for example. At step 304, the NET of an originating node, node AA, for example, is extracted from the TARP PDU. At step 306, the NET is used to determine whether the originating node AA is in the same area as the receiving node CC. If both originating and receiving nodes are determined to be in the same area, the process continues at step 308, where the NET is used as an index into the level 1 forwarding database 208 of the receiving node CC to retrieve the optimal interface identifier for originating node AA. The optimal interface identifier, 1ns, for node AA is the interface node CC would use to transmit a TARP PDU to AA based upon the shortest path routing algorithm. At determination step 310, it is determined whether the interface identifier, 1nr, over which the TARP PDU was actually received at CC is equal to the optimal interface identifier, 1ns, retrieved from the level 1 database of CC. If they are determined not to be equal the TARP PDU is dropped by the receiving node CC at step 314, and the process terminates at step 316. Otherwise, if the actual and optimal interface ID's are equal, i.e., 1nr=1ns, the received TARP PDU is forwarded over each interface associated with the receiving node, except for the receiving interface, which is the optimal interface at step 312.

If at determination step 306, it is determined that the originating and receiving nodes are not located in the same OSI routing area, control is transferred to FIG. 3B. In further explanation of the present invention, assume that the receiving node is no longer CC, but instead HH.

FIG. 3B illustrates the process steps for the case where the originating node and receiving node are not located in the same area, and the receiving node HH is determined to be an IS1 node.

Referring to FIG. 3B, step 318 is a determination step to determine whether the receiving node, i.e., node HH, is an IS1 or IS2 node. Under the IS-IS routing protocol, nodes are typically referred to as Intermediate Systems (ISs).

If it is determined at step 318 that the receiving node is an IS1 node, the process continues at step 320. At step 320, the enhanced TARP engine 210 associated with node HH searches for the closest IS2 node in the same routing area as the newly defined receiving node HH. A closest IS2 node must be located because receiving node HH, being an IS1 node does not contain a row entry for node AA since AA is located in a different level 1 routing area. Receiving node HH would search for the closest IS2 node in the area in which it is located, area 27, and identify IS2 node EE. Once identified, the level 1 database of node HH is referenced to determine whether the broadcast TARP PDU received from originating node AA was received over an optimal interface, 1ns, at node HH. The interface is an optimal interface used by HH to send a TARP PDU to its closest IS2 node, i.e., EE in the area using a shortest path metric. This determination is performed at decision step 322. If the TARP PDU is received from a non-optimal interface, the TARP PDU is dropped by receiving node HH at step 324, and the process terminates at step 328. Otherwise, if the interface is determined to be optimal (i.e., 1nr=1ns), the TARP PDU is forwarded along each interface associated with node HH with the exception of the receiving (i.e., optimal) interface at step 326.

If at determination step 318, it is determined that the receiving node is an IS2 node, the process continues to FIG. 3C. In further illustration of the present invention, assume that the receiving node is no longer HH, but rather node II. At step 330, the enhanced TARP engine associated with node II performs a search in the same area as the originating node AA to determine which IS2 node is closest to the originating node II. In the present example, FIG. 1, node CC is identified as the closest IS2 node to originating node II and is located in the same area as AA. Once identified, the NET of CC is used as an index into the level 2 database of node II to determine whether the broadcast TARP PDU originated from node AA was received over an optimal interface, 1ns. The optimal interface used by node II to send a TARP PDU to CC is optimal in the "shortest path" sense. This determination is performed at decision step 332. If they are not equal, the TARP PDU is dropped by the receiving node at step 336, and the process terminates at step 338. Otherwise if they are equal, the TARP PDU is forwarded along each interface associated with node II except for the receiving interface.

While the invention has been particularly shown and described with reference to certain embodiments, it will be understood by those skilled in the art that various modifications in form and detail may be made therein without departing from the scope and spirit of the invention. Accordingly, modification to the preferred embodiments will be readily apparent to those skilled in the art, and the generic principles defined herein may be applied to other embodiments or applications without departing from the scope and spirit of the invention.

What is claimed is:

1. A method for propagating a target identifier address resolution packet (TARP PDU) over a large network that includes a plurality of nodes each having an IS-IS routing engine with a forwarding database which is dynamically updated to determine optimal routes between network nodes, said method comprising the steps of:

broadcasting, by an originating node, the TARP PDU that is addressed to a target node;

receiving, by a plurality of receiving nodes, the TARP PDU;

storing, by the plurality of receiving nodes, the TARP PDU and an interface identifier (1nr1) which identifies an interface over which the receiving node received the TARP PDU from the originating node;

determining, by each receiving node, whether the receiving node is in a same routing area as the originating node;

retrieving, from a forwarding database of the IS-IS routing engine, an optimal interface identifier (1ns1), wherein the 1ns1 identifies a reverse shortest path interface which the receiving node would use for transmission back to the originating node;

comparing, by the receiving node, the 1ns1 and the 1nr1;

broadcasting, if the receiving node determines that the 1ns1 is equal to the 1nr1, the TARP PDU onto the network; and dropping, if the receiving node determines that the 1ns1 is not equal to the 1nr1, the TARP PDU, thereby reducing the creation of loops on the network.

2. The method according to claim 1, wherein said routing area is one of a ring star, and bus network topology.

3. A receiving node having an integral IS-IS routing engine which includes a forwarding database which is dynamically updated to determine optimal routes between a plurality of network nodes, wherein the receiving node:

receives, from an originating node, a target identifier address resolution packet (TARP PDU) addressed to a target node;

stores the TARP PDU;

accesses the forwarding database and identifies an interface identifier (1nr1) which identifies an interface over which the receiving node received the TARP PDU from the originating node;

retrieves from the forwarding database an optimal interface identifier (1ns1) which identifies a reverse shortest path interface which the receiving node would use for transmission back to the originating node;

compares 1ns1 and 1nr1;

broadcasts, if 1ns1 is equal to 1nr1, the TARP PDU onto the network; and drops, if 1ns1 is not equal to 1nr1, the TARP PDU, thereby reducing the creation of loops on the network.

\* \* \* \* \*